(12) United States Patent
Strandberg et al.

(10) Patent No.: US 7,307,954 B1
(45) Date of Patent: *Dec. 11, 2007

(54) DIFFERENTIATED SERVICE NETWORK AND METHOD OF OPERATING A DIFFERENTIATED SERVICE NETWORK

(75) Inventors: Ove Strandberg, Cupertino, CA (US); Martha Zimet, Santa Cruz, CA (US); Cedric Westphal, San Francisco, CA (US)

(73) Assignee: Nokia Corporation, Espoo (FI)

( * ) Notice: Subject to any disclaimer, the term of this patent is extended or adjusted under 35 U.S.C. 154(b) by 722 days.

This patent is subject to a terminal disclaimer.

(21) Appl. No.: 09/599,736

(22) Filed: Jun. 23, 2000

(51) Int. Cl.
*H04J 1/16* (2006.01)
*H04L 12/26* (2006.01)

(52) U.S. Cl. ............ 370/235; 370/229; 370/230; 370/236; 370/241; 370/389; 370/401; 709/224

(58) Field of Classification Search ........ 370/252, 370/253, 400, 401, 235, 236, 468, 412, 229, 370/389, 438, 466, 241, 230, 230.1, 231, 370/232, 233, 234; 709/223, 224
See application file for complete search history.

(56) References Cited

U.S. PATENT DOCUMENTS

| | | | |
|---|---|---|---|
| 5,313,454 A | | 5/1994 | Bustini et al. ............. 370/13 |
| 5,745,697 A | | 4/1998 | Charny et al. |
| 5,761,429 A | * | 6/1998 | Thompson ................ 709/224 |
| 6,047,322 A | * | 4/2000 | Vaid et al. ................ 709/224 |
| 6,188,698 B1 | * | 2/2001 | Galand et al. ............ 370/412 |
| 6,363,053 B1 | * | 3/2002 | Schuster et al. .......... 370/230 |
| 6,404,738 B1 | * | 6/2002 | Reininger et al. ......... 370/236 |
| 6,483,805 B1 | * | 11/2002 | Davies et al. ............. 370/235 |
| 6,542,466 B1 | * | 4/2003 | Pashtan et al. ............ 370/235 |
| 6,567,382 B1 | * | 5/2003 | Cox ......................... 370/255 |
| 6,590,867 B1 | * | 7/2003 | Ash et al. .................. 370/236 |
| 6,594,277 B1 | * | 7/2003 | Chiang et al. ............. 370/465 |
| 6,597,699 B1 | * | 7/2003 | Ayres ....................... 370/400 |
| 6,631,122 B1 | * | 10/2003 | Arunachalam et al. .... 370/332 |
| 6,647,412 B1 | * | 11/2003 | Strandberg et al. ....... 709/223 |
| 6,657,962 B1 | * | 12/2003 | Barri et al. ................ 370/235 |
| 6,744,767 B1 | | 6/2004 | Chiu et al. .............. 370/395.21 |
| 6,748,433 B1 | * | 6/2004 | Yaakov .................... 709/224 |
| 6,865,185 B1 | * | 3/2005 | Patel et al. ................ 370/412 |
| 6,973,033 B1 | * | 12/2005 | Chiu et al. .............. 370/230.1 |

(Continued)

OTHER PUBLICATIONS

D. D. Clark, et al., "Explicit Allocation of Best-Effort Packet Delivery Service", IEEE/ACM Transactions on Networking, vol. 6, No. 4, Aug. 1, 1998, pp. 362-373, XP-000771971.

(Continued)

*Primary Examiner*—Edan Orgad
*Assistant Examiner*—Chuong Ho
(74) *Attorney, Agent, or Firm*—Squire, Sanders & Dempsey L.L.P.

(57) ABSTRACT

A differentiated service network having a plurality of routers. An operating condition such as stability may be determined at a first router. An indication of the operating condition may be propagated from a first router to a second router such as an edge router. Based on the indication of the operating condition, one or more parameters of a constraint may be adjusted. The indication may be a signal corresponding to a network traffic status.

29 Claims, 5 Drawing Sheets

U.S. PATENT DOCUMENTS

| | | | |
|---|---|---|---|
| 7,068,607 B2 * | 6/2006 | Partain et al. | 370/241 |
| 7,251,690 B2 * | 7/2007 | Williams | 709/224 |
| 2002/0073147 A1 * | 6/2002 | Aoki | 709/203 |

OTHER PUBLICATIONS

A. O'Neill, et al., "An Overview of Internet Protocols", BT Technology Journal, vol. 16, No. 1, Jan. 1998, pp. 126-139, XP000736934.

V. P. Kumar, et al., "Beyond Best Effort: Router Architectures for the Differentiated Services of Tomorrow's Internet", IEEE Communications Magazine, vol. 36, No. 5, May 1, 1998, pp. 152-164, XP000752860.

TCP/IP Illustrated vol. 1, The Protocols, Richard Stevens, Addision-Wesley Professional Computing Series, 1994, ISBN 0-201-63346-9 (v. 1), pp. 117 and 124).

* cited by examiner

DIFFERENTIATED SERVICE NETWORK AND METHOD OF OPERATING A DIFFERENTIATED SERVICE NETWORK

FIELD OF THE INVENTION

This invention relates generally to a differentiated service network and method of operating the network.

DESCRIPTION OF RELATED ART

Increasing competition requires that service providers, such as ISPs, offer scalable differentiated services that support their customers existing and emerging business applications. Service providers must not only differentiate among applications but also aggregate the traffic and then set priorities directly related to the latency, throughput, loss and jitter application requirements.

A differentiated service network performs packet marking, and subsequent packet buffering and scheduling in order to introduce differentiation of quality of service (QoS). Differentiated service mechanisms allow service providers to allocate varying levels of service to Internet users. This may include traffic management or bandwidth control mechanisms that treat different users differently. The IETF DiffServ Working Group has defined five classes of packet marking, namely the expedited forwarding class and the assured forwarding classes 1-4. These classes differentiate packets and flows, and while the relationship between the classes are not defined in detail, they are assumed to be specified by the network operator.

The realization of differentiated service networks is somewhat ambivalent and problematic. It relies on general and common mechanisms for packet treatment. At the same time, operation of a differentiated service network relies heavily on correct provisioning of the network according to traffic requirements. This assumes that traffic requirements themselves are static and are not expected to change over time. Even with correct provisioning, networks cannot correct the on-the-fly packet marking and dynamically adjust to the new operating conditions in the network.

SUMMARY OF THE INVENTION

Embodiments of the present invention may provide a method of operating a differentiated service network having a plurality of routers. This may involve determining an operating condition at a first router and propagating an indication (i.e., a signal) of the operating condition at the first router to a second router.

Embodiments of the present invention may provide a method of receiving an indication of an operating condition at a first router and adjusting at least one parameter of a constraint or rule contained in the network profile based on the indication of the operating condition.

Embodiments of the present invention may provide a differentiated service networking including a first router and a second router coupled to the first router. The first router may be associated with a first entity (i.e., a QoS Firewall entity) to determine an operating condition at the first router.

Other objects, advantages and salient features of the invention will become apparent from the following detailed description taken in conjunction with the annexed drawings, which disclose preferred embodiments of the invention.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and is not limited thereto. The spirit and scope of the present invention being limited only by the terms of the appended claims.

The present invention will be described with reference to the following drawings in which like reference numerals represent like elements and wherein.

DETAILED DESCRIPTION OF PREFERRED EMBODIMENTS

Figure 1:
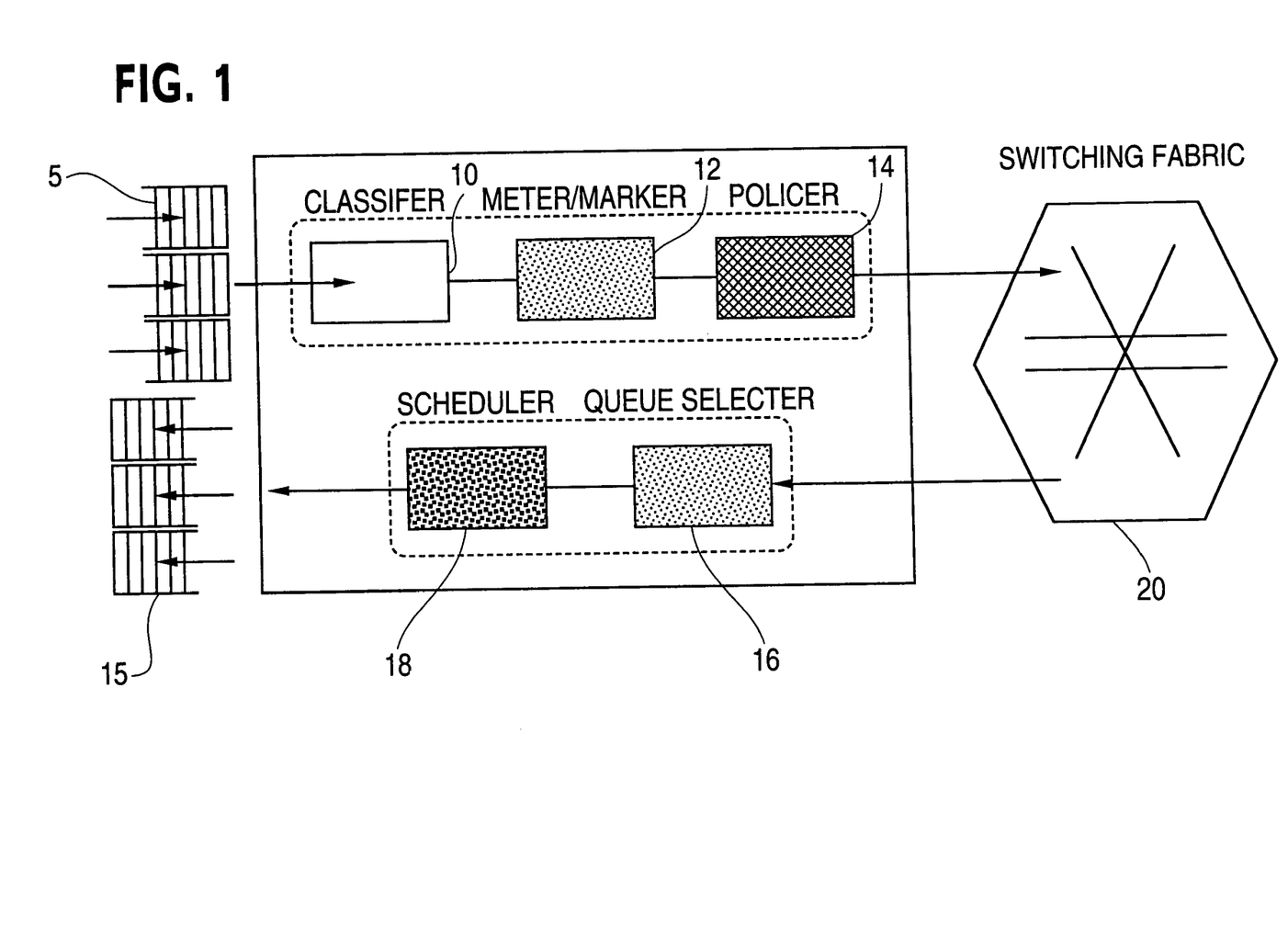
FIG. 1 shows an implementation model of a differentiated service network.

FIG. 1 shows an implementation model of differentiated services. This Figure shows the functional treatment of data packets as they enter and leave a switched fabric 20. Each of these functional modules may be performed by an edge router of the network. A classifier device 10 may examine inbound data packets 5 and identify flows and associated performance parameters. A meter/marker device 12 may measure properties selected by the classifier device 10 and mark packet headers according to the classification. A policer device 14 may monitor traffic flows to determine conformance with a bandwidth agreement and enforce the service level contracts. A queue selecter device 16 may queue packets according to their output classification and drop packets according to their discard policy. A scheduler device 18 may schedule packets 15 for transmission on the outbound link in order to provide the level of service guaranteed by a service level contract.

Figure 2:
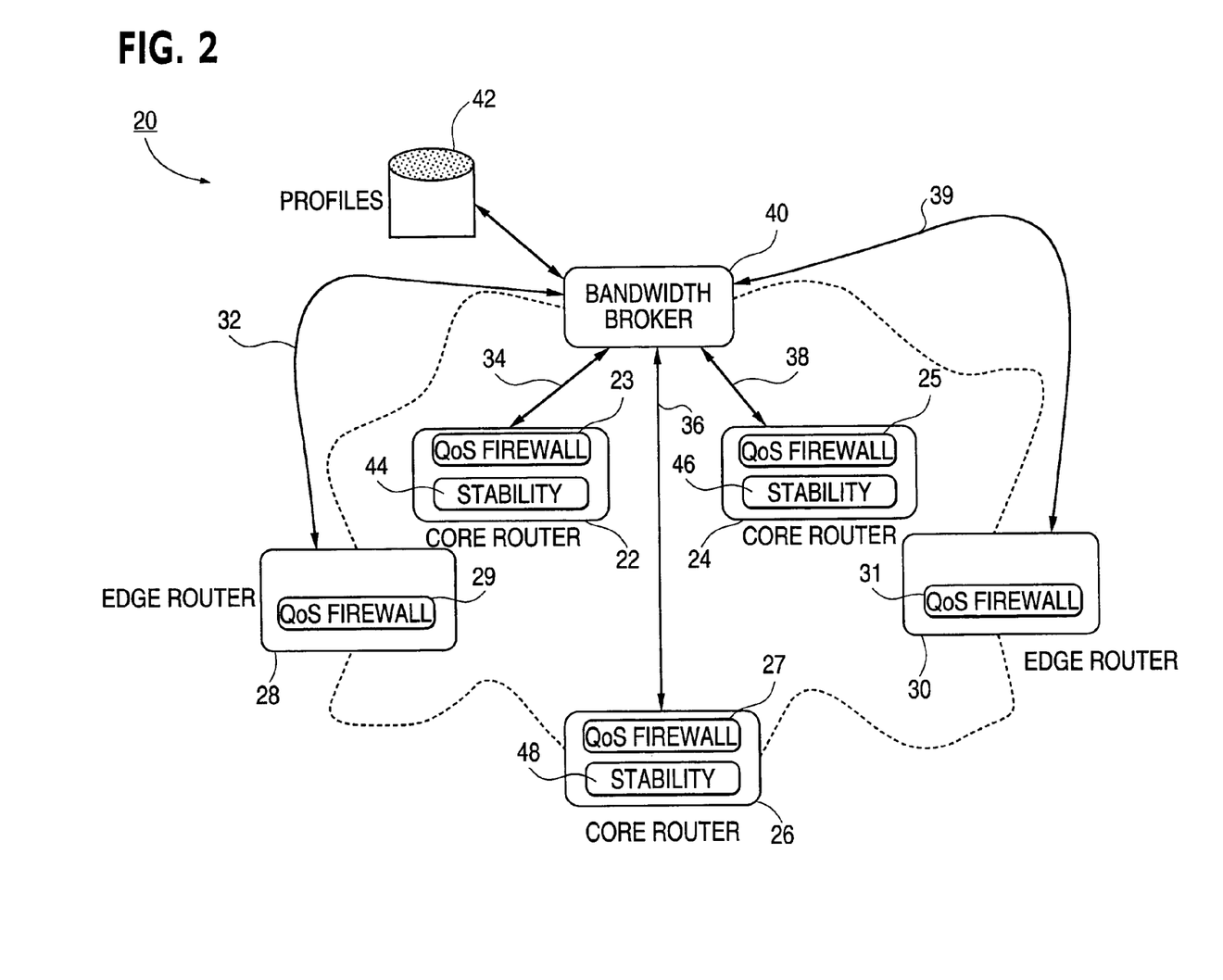
FIG. 2 shows a differentiated service network according to an example embodiment of the present invention.

FIG. 2 shows an example differentiated service network 20 according to an example embodiment of the present invention. The network 20 may include three core routers 22, 24 and 26, two edge routers 28 and 30, a bandwidth broker 40 and a policy database 42. The routers may contain an operating system kernel to support the functions to be performed. Other configurations and embodiments of the differentiated service network 20 are also within the scope of the present invention.

The edge routers 28 and 30 may maintain the state of the traffic flow, enforce the policy of the traffic entering the network 20, map user requirements to the network resources and negotiate between user preferences and network capabilities. A typical chain of actions performed on input traffic may include the following: classification, metering, policy lookup and policing, shaping and marking. Output traffic may require information in order to control proper buffering and scheduling.

Packet marking is important to the differentiated service network 20. For example, in case of the expedited forwarding class, the edge routers 28 and 30 may check the relevant traffic profile to verify that the required traffic flow fits the output aggregate specified for the class. In case of the assured forwarding classes 1-4, the data packets may be checked against the traffic profile and depending on the rate of the flow, the packets may be assigned a priority within the assured forwarding class. A flow complying with the traffic profile may receive the best treatment by being marked the highest priority.

The network operator (e.g., an ISP) and customer relationship may be defined by a traffic profile, hereafter also referred to as a contract, policy or service level agreement. The profile may describe the rules and constraints for the packet marking. The rules list may be calculated with a classifier style approach or as a linked list with flow attributes. The rules may be composed of a value statement and an action to be performed. The aggregation of the rules is an agreement between the customer and the operator that specifies the quality of service (i.e., the QoS) the customer requires and the cost associated with that service.

As shown in FIG. 2, each of the edge routers 28 and 30 and each of the core routers 22, 24 and 26 may include a QoS Firewall entity 23, 25, 27, 29 and 31. The QoS Firewall entity may be a software implementation within each of the routers. The QoS Firewall entities may also be provided in a unit external to the router. The QoS Firewall entities may interface with any outside mechanism that wants to or tends to push QoS policy to the router. Each of the core routers 22, 24 and 26 may also include a stability entity 44, 46 and 48 that may also be a software implementation to provide stability and fairness services. For ease of discussion, embodiments of the present invention may describe stability and fairness services as being part of the QoS Firewall entities although they may also be their own entity.

Management of the traffic profile and its associated list of rules may be performed by the QoS Firewall entities 23, 25, 27, 29 and 31. The QoS Firewall entities 23, 25, 27, 29 and 31 may communicate with all interested parties regarding updates of the rule set. The QoS Firewall entities 23, 25, 27, 29 and 31 may also contain the management functionality to handle security, authentication, and translation of the policy request to accomplish reliable and correct operation of the differentiated service network 20. The QoS Firewall entities 23, 25, 27, 29 and 31 may also manage buffers and schedule queue weights.

The QoS Firewall entities 23, 25, 27, 29 and 31 may also interface with policy servers and their proxy agents, map (i.e., translate) user requirements to system-level resources, dispatch notification, error and other events and mediate between static and dynamic input data.

The core routers 22, 24 and 26 are provided in the interior of the network 20 to forward data packets according to their packet marking. For example, data packets may be forwarded from edge router 28 to core router 26 and then to edge router 30. In the core routers 22, 24 and 26, differentiation of traffic classes may be realized through treatment of buffer queues and scheduling methods.

The queue size for the differentiated service classes may influence the delay for the traffic flow. For example, the expedited forwarding class may be defined to have a minimum delay. In such a case, the expedited forwarding queue may be small compared to the queue of the other classes. The size of the assured forwarding class queues may be specified by the operator. Typically, the assured forwarding class 1 will have a much shorter queue than the queue of the assured forwarding class 4. A threshold may be associated with each queue to indicate packet discard probability.

The weight for the queue scheduling of the differentiated service classes may determine the available bandwidth. For example, the bandwidth of the expedited service class may be dependent on the weight associated with the expedited service queue. Allocation of bandwidth for the classes may also be operator dependent. Different weights may be allocated for every link and class in order to realize a fair and stable network. Fairness indicates fair from a service level expectation and stable indicates the network will be able to operate correctly so that there is no prolonged starvation for less worthy traffic classes. The weight calculation may be similar to the physical link size and used as the primary parameter in provisioning the differentiated service network 20.

The QoS Firewall entities 23, 25, 27, 29 and 31 may handle the weight management of queues and threshold management of the drop probability. The thresholds and weights may be communicated to the QoS Firewall entities 23, 25 and 27 in the core routers 22, 24 and 26 from various controlling units, such as the bandwidth broker 40.

The bandwidth broker 40 may negotiate the policy for traffic flows entering the network 20 through the edge routers 28 and 30. The bandwidth broker 40 may be responsible for proper allocation of traffic in the network 20. Accuracy may be increased by the bandwidth broker 40 collecting the network topology through query of the routing tables of the different nodes in the network 20. The bandwidth broker 40 may maximize the policies accepted while still guaranteeing a fair and stable network.

The bandwidth broker 40 preferably is an agent responsible for allocating preferred service to users and for configuring the routers 22, 24, 26, 28 and 30 with the correct forwarding behavior for the defined service. A policy database 42 may be connected to the bandwidth broker 40 and contain information on how users, sets of users, content types, etc. are treated while they are present in the network 20. In addition, the database 42 may contain information to authenticate requesters.

The bandwidth broker 40 may rely on heuristical values and rules set by the operator in order to provision the network 20. The traffic profiles, queue weights and drop probability thresholds may also be determined by the values set by the operator. The bandwidth broker 40 may obtain feedback from the routers 22, 24, 26, 28 and 30 about the traffic flow conditions for each of the traffic classes and for every link. For example, FIG. 2 shows communication signals 32, 34, 36, 38 and 39 between each of the routers and the bandwidth broker 40. The signals 32, 34, 36, 38 and 40 may contain the feedback information. More specifically, the communication signal 32 may be transmitted between the bandwidth broker 40 and the edge router 28. The communication signal 34 may be transmitted between the bandwidth broker 40 and the core router 34. The communication signal 36 may be transmitted between the bandwidth broker 40 and the core router 26. The communication signal 38 may be transmitted between the bandwidth broker 40 and the core router 24. The communication signal 39 may be transmitted between the bandwidth broker 40 and the edge router 30. Other types of signals and methods of transmitting signals are also within the scope of the present invention.

Rather than identifying the individual flows or packets metric (e.g. packet loss rate, delay, etc.), the bandwidth broker 40 may map the quantitative values into qualitative indications. This may be accomplished using a signal corresponding to a state parameter such as a network traffic status. This state parameter may be represented by a color such as red, green or yellow and may be communicated rather than relaying the packet loss rate for a given traffic class. A different number of state parameters may also be communicated in accordance with the present invention.

In order to calculate the quantitative indications, the network 20 may utilize packet loss as an indication for reactive actions. Average service of the given traffic classes and their associated flows may be used to calculate the quantitative indication. Fair and stable network parameters may be used for guidelines.

Stable operation of average traffic through a router is desirable, and this stability may take the value of the different traffic classes into account. Therefore, in accordance with the present invention, a calculation may be performed by the QoS Firewall entity in every router to set the scheduling weight and to communicate the status such as a signal corresponding to red, green or yellow. A signal corresponding to this color indication may be propagated to the edge routers 28 and 30 and the bandwidth broker 40.

Stability of the network 20 may be dependent on scheduling decisions made at the router level. There are two notions for stability. First is router overflow when the number of packets coming to the network 20 is too high with respect to the processing capability of the router. Despite the order the data packets are processed, the incoming workload may exceed the capacity of the individual router. Second is network instability when higher precedence is given to certain classes so as to starve some of the router's traffic and create blocking or oscillatory modes.

A randomized schedule with weights depending on the precedence level of the class may be provided such that when router stability is satisfied, then so is the network stability. Randomness may break the blocking patterns and the oscillation modes. Furthermore, if the weights are fixed with respect to a QoS agreement then stability regions may be defined. For example, the assured forwarding class 1 may receive a service probability twice that of the assured forwarding class 2, which may receive a service probability twice that of the assured forwarding class 3, which may receive a service probability twice that of the assured forwarding class 4.

A stability region may be a relation between the different flow rates for the respective QoS classes. These stability regions may provide a qualitative indication on the stability of the network 20. As will be discussed below, the routers 22, 24, 26, 28 and 30 may compute the flow of the incoming classes, and check which area of its processing domain it is, and then issue an indication such as a signal corresponding to one of the colors of green, yellow or red. When these indication signals are received by the edge routers 28 and 30 and/or the bandwidth broker 40 then a decision may be made regarding the traffic flow.

Figure 3:
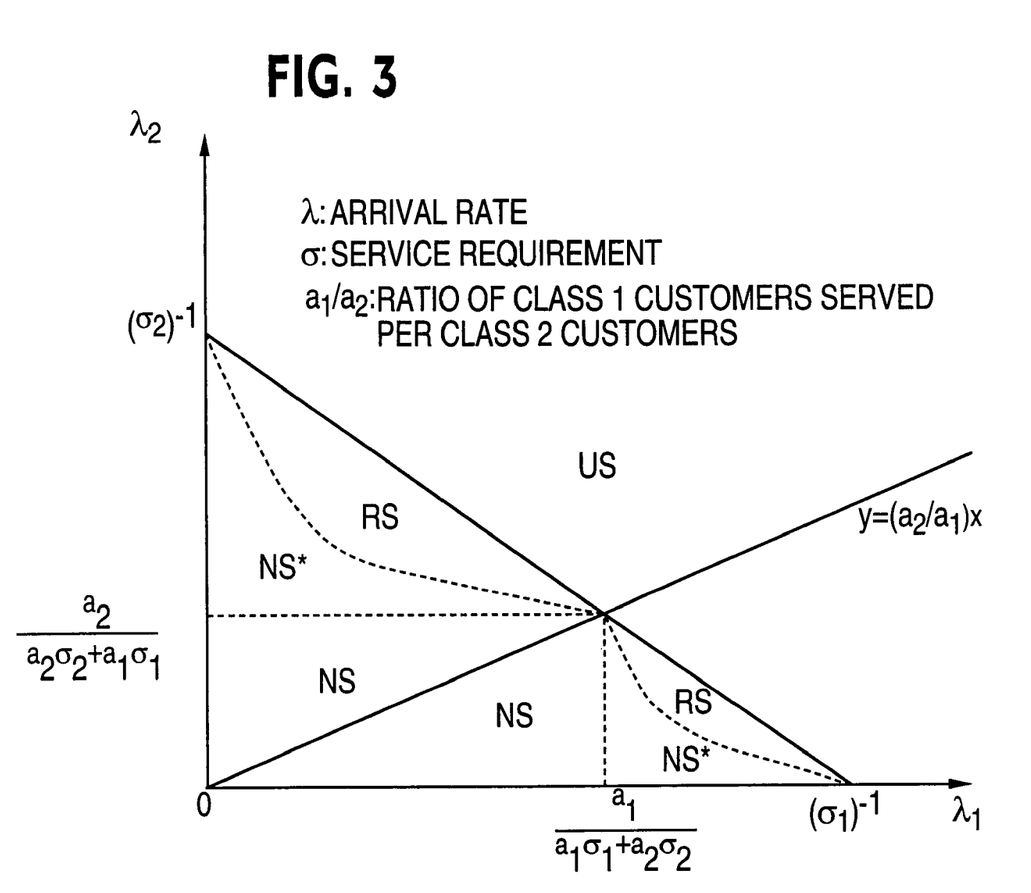
FIG. 3 shows a stability graph for a two-class network.

FIG. 3 shows a stability graph for a two-class network (i.e., $\lambda_1$ and $\lambda_2$). Based on a stability calculation that will be described below, if the result of the calculation falls within the unstable area US as shown on the graph, then a red indicator may be provided symbolizing a congestion state. If the calculation falls within the area RS as shown on the graph, then a yellow indicator may be provided. Finally, if the calculation falls within the area NS as shown on the graph, then a green indicator may be provided. The present invention is also applicable to indicators other than red, yellow and green.

The greater the network stability (NS) domain, the more efficient the policy. The network stability domain may be the domain where higher priority may be given to trickling flows without threatening the overall stability of the network 20. The network stability may be given as the waiting time of packets in a router. The scheduling weights and scheduling decisions may be computed at each of the routers 22, 24, 26, 28 and 30 and be distributed independent of the network topology. The information to make decisions may be acquired on line and may be adaptive to long-term traffic fluctuations and network topology changes.

As discussed above, each class may correspond to a level of service in which each class is treated differently according to an agreement between the customer and the service provider. However, due to bandwidth constraints on links between routers, some data packets may have to wait in the individual router before they are propagated to the next router. The data packets may be ordered and scheduled in the output buffers of the respective routers. However, the buffers may overflow due to burstiness of the sources, or burstiness created by the network-wide interactions between the different flows.

A randomized scheduling algorithm may pick packets according to a distribution to prevent the burstiness and ensure long term stability over the network. The distribution may be computed according to the value of the traffic rates. In order to ensure flow conservation, the distribution may be picked to give more weight to flows having a greater incoming packets arrival rate.

One condition for stability may be that the average traffic on a link may be less than the capacity of the link. This condition should be satisfied for the network to be stable. The load on the link should be less than one (i.e., p<1) for this condition to be satisfied, where p is the ratio of the average time it takes for a link to process a packet divided by its interarrival time.

The four levels of the assured forwarding classes 1-4 may share the bandwidth left after processing the expedited forwarding class. For example, assume the network knows how many packets of the assured forwarding class 1 have to be processed for each packet of the assured forwarding class 4. Then, when congestion occurs, the network may assume that on average for $a_4$ packets of the assured forwarding class 4, the network may serve $a_3$ packets of the assured forwarding class 3, $a_2$ packets of the assured forwarding class 2, and $a_1$ packets of the assured forwarding class 1. The higher the ratio $a_1/a_4$, the higher the precedence of the assured forwarding class 1.

The ratios may accommodate traffic with incoming flows such that $\lambda_1/\lambda_4 = a_1/a_4$ and $\lambda_j/\lambda_i = a_j/a_i$, where $\lambda_1$ is the arrival rate (i.e., the inverse of the mean interarrival time). This together with the necessary condition for stability p<1 may define a stability hyperplan.

The effective load at a given level of QoS is the quantity that takes into account the worst case effect of the other levels of service. For example, a data packet from a lower class may feel the effect of data packets from other classes. This may be reflected in the effective load of this class.

The randomized scheduling policy may have a Poisson-like behavior. The effective load of class i on a fixed link may be given by:

$$p_i^e = \left( \sigma_i + \sum_{j=1,2,3,4; j \neq 1} a_j/a_i p_j^e \sigma_j \right) \lambda_i \quad (1)$$

where $\sigma_j$ is the average time it takes for the fixed link to process a packet of class j and $\lambda_i$ is the arrival rate.

Based on equation (1), the effective load may be proportional to the arrival rate and the interaction between different classes may be expressed by the $p_j^e$'s in the definition of $p_i^e$. It is desirable that $p^e < 1$ for all classes and all nodes to ensure the stability of the network.

An example algorithm that computes the effective load on each link will now be described. Incoming streams at a router may be sorted by their destination port, and sent to the respective output buffers. These streams may be then scheduled to be sent on their destination link according to their priority level. The following algorithm may be provided at the output buffer to evaluate the quantities that it needs (i.e., the packets' lengths and the arrival rates). From these quantities, the effective loads may be computed for each level of service, and a signal representing a flag may be sent to the bandwidth broker 40 providing a distance from the unstable region. The tasks may then be scheduled so they are sent to the output link according to their priority level. The algorithm may therefore perform an evaluation procedure, a computation procedure and a scheduling procedure as will now be described.

During the evaluation procedure, the router may track the arrival rate of each class (arr_rate[class]), the mean service time of each class (srv_time[class]) and the arrival time of the last packet of each class (arr_time[class]).

Upon the arrival of a new packet, the algorithm may update these quantities as follow:

$$arr\_rate[class]=1/(p1(time-arr\_time[class])+(1-p1)/arr\_rate[class]) \quad (2)$$

$$srv\_time[class]=p2(pk\_length/link\_rate)+(1-p2)srv\_time[class] \quad (3)$$

$$arr\_time[class]=time. \quad (4)$$

The parameters p1 and p2 are quantities between 0 and 1. A small p1 or p2 may provide a better estimate of the long term behavior of the traffic patterns, but may converge more slowly to the mean value.

During the computation procedure, the effective loads may be computed with the following iterative steps using the values of arr_rate[class] and srv_time[class]. The effective load values may be stored in the array rho[class].

Initialization. rho [i]=0 for all classes i.

Iteration. $rho[i]=(srv\_time[i]+\Sigma a_j/a_i rho[j] srv\_time[j])arr\_rate[i]$.

For the assured forwarding class 1, for example, rho [AF1]=(srv_time[AF1]+a(AF2)/a(AF1) rho[AF2] srv_time (AF2)+ . . . +a(AF4)/a)AF1) rho[AF4]srv_time(AF4). The global stability condition may be computed as follows: rho[link]=Σ srv_time[i] arr-rate[i].

If the values of arr_rate[class] and srv_time[class] converge to a constant, then so will rho. Also, rho may converge increasingly starting from 0.

For the network to be stable, p[i]<1 for all classes and all routers. The distance from p[i] to 1 may be the indication of congestion. Congestion may occur if only one of the p[i] is more than 1.

Each router 22, 24, 26, 28 and 30 may send to the bandwidth broker 40 either the distance from one for the effective load of each class on each link, or a signal indicating a network traffic status. The network traffic status may be represented by a coloring scheme that packetizes the distances into an indication of congestion. The core routers 22, 24 and 26 may also forward this information to the edge routers 28 and 30.

One example embodiment may use the following coloring scheme. If all p[i]<1, then the color indication may be green. Green may represent stability. The color indication may be yellow when the necessary stability condition is satisfied, namely p[i]<1, but at least one of the rho [i] is more than 1. Yellow may represent an indication between stable and unstable. The color indication may be red when p[i]>1. Red may represent unstable. Other colors, indications and methods of determining the degree of stability and unstability are also within the scope of the present invention.

The functional modules that implement the QoS Firewall entities 23, 25, 27, 29 and 31 and its model of service sellers (providers) and buyers (customers) will now be described in greater detail.

The QoS Firewall entities 23, 25, 27, 29 and 31 may perform several functions including but not limited to: (1) interface with policy servers and their proxy agents; (2) make admission control decisions; (3) capture user QoS requirements; (4) create store, retrieve, and modify service-level contracts (profiles); (5) negotiate between user requests and system-level constraints; (6) make QoS trade-off decisions; (7) map requirements to system-level resources according to a pre-described set of rules; (8) monitor QoS service levels; (9) dispatch notification, error and other events; (10) mediate between static and dynamic input data; and (11) provide locking on data being modified.

The QoS Firewall entities 23, 25, 27, 29 and 31 may also interface with the several system components, including but not limited to QoS client(s), other QoS Firewall entities, OS kernel and policy servers, policy proxies, etc.

One or more autonomous service agents may communicate and cooperate with each other via a message bus to support QoS configuration, negotiation and monitoring. The service agents (e.g. billing, negotiation, monitoring, etc.) may exist on different platforms linked by communication channels. Service agents are considered 'sellers' or 'providers' of a particular service, and clients are considered 'buyers' or 'customers' of the service. There may be no restrictions or constraints as to the location of the service agents in the network 20. That is, the service agents may exist on every end-system or every node in the network 20.

The union of all the QoS service agents is equivalent to a single QoS Firewall entity that supports mapping of QoS parameters from application level to system level, negotiation of QoS parameters, reservation of resources in the system and reacting to QoS fluctuations. That is, the QoS Firewall entities 23, 25, 27, 29 and 31 may be a functional aggregate of one or more QoS service agents.

In order to realize the QoS service providers and their customers the following function modules may be provided within the entity: (1) a user interface module; (2) a mapping module; (3) a reservation module; (4) a monitoring module; (5) an adaptation/negotiation module; and (6) an inter/intra communication module.

The user interface module may provide the means to describe lists of parameters, which are in the form of name/value pairs. The mapping module may translate user-level parameters into a set of system level parameters (e.g., host and network parameters). The reservation module may reserve system/host/network resources needed by a user customer according to their requirements. The monitoring module may control and measure watermark levels, and in the case of violations, send an alert message to the adaptation module that executes local mechanisms for violation recovery. The adaptation/negotiation module may execute mechanisms that attempt to correct network/system degradation. In addition, this module may handle negotiations between users' QoS parameter requests and system-level constraints.

The inter/intra communication module may implement reliable communication channels between QoS Firewall entities, associated agents and their customers. This module may also define the communication endpoints (sellers and buyers) and the services between the endpoints. For example, the protocol to communicate with a signaling daemon in order to reserve network resources may be specified in this module.

In addition, the inter/intra communication module may implement the message bus facility that provides flexible methods for service providers and consumers to communicate with one another and share data. Requests may be messages sent to a component to request it perform some action, events may be messages that are broadcast by a provider and received by consumers. Consumers may subscribe to the classes of events they want to receive, and the message bus may keep track of the event subscription.

Any QoS API that defines the request/reply protocol stream between a QoS service and its customers may be implemented on top of the communication module and its associated sub-modules. In other words, these functional modules are the lowest in the QoS framework.

These functional modules may provide an infrastructure for a simple code-exchange and data-exchange based system. Data-exchange signifies that the logic of an client application is statically installed and coordination with a server application is accomplished by exchanging data messages according to a predefined protocol. Code-exchange may mean that coordination between clients and servers is achieved by sending around code fragments that alter the data instances inside the network's hosts. The resulting system may be a combination of both models whereby code-exchange will take place using an interpreted language between service providers and customers, and classical data-exchange techniques may be used in data streams between service providers.

Embodiments of the present invention may provide unique features and advantages. The edge-style composition and propagation of network status information may provide a scalable and robust solution. Intelligence in the routers and QoS Firewall entities 23, 25, 27, 29 and 31 may provide fallback mechanisms when a bandwidth broker 40 is unavailable. The stability calculation may be a refined and coalesced monitoring value that simplifies network management. The feedback mechanism may be achieved since QoS Firewall entities 23, 25, 27, 29 and 31 may communicate with the edge routers 28 and 30 or the bandwidth broker 40. The edge routers 28 and 30 or the bandwidth broker 40 may dynamically set profiles or network node parameters to comply with real network situations based on the information they receive from the feedback mechanism.

A QoS negotiation and renegotiation procedure according to an example embodiment of the present invention will now be described. A QoS parameter value may change during the lifetime of a connection. That is, once negotiated, in accordance with the present invention a QoS parameter value may be renegotiated.

Thus, the network 20 may dynamically adjust the QoS of a live connection or flow without requiring disconnect/reconnect. For example, the edge router 28 may receive an indication of an operating condition such as a signal corresponding to the stability of a core router. The QoS Firewall entity 29 of the edge router 28 may then adjust a parameter of a constraint in the network profile based on the indiction of the operating condition. The QoS Firewall entity 29 may renegotiate the constraint or may make a recommendation to the network operator on changing the profile.

The network may specify a set of prioritized QoS parameters, including cost metrics. The QoS Firewall entities 23, 25, 27, 29 and 31 may contain the intelligence and logic necessary to perform QoS parameter mapping and resource usage calculation. Additionally, the QoS Firewall entities 23, 25, 27, 29 and 31 may contain the intelligence and logic necessary to make trade-off decisions based on the importance of the QoS parameters, customer priority ranking and costs associated with meeting those parameters. In one example embodiment, the user may specify a plurality of constraints in order of importance. If degradation of service occurs, then the QoS Firewall entity may operate to select the highest constraint that does not result in degradation of service. The QoS Firewall entity may also renegotiate with the underlying router to determine if the changed parameters can be accommodated. This may be done without cutting off service to the traffic flow.

The above described embodiments discussed the mechanisms to achieve QoS negotiation. The following will describe how initial QoS requirements may be realized and describe what happens when the QoS Firewall entities 23, 25, 27, 29 and 31 receive the color signal indicating that some action should be performed due to adverse conditions in the network. U.S. patent application Ser. No. 09/599,737 entitled "Method And Network For Propagating Status Information", the subject matter of which is incorporated herein by reference, discloses example embodiments of how signals (such as color indications) may be propagated through the network.

QoS requirements may be conveyed from the QoS client to the QoS Firewall entities 23, 25, 27, 29 and 31. The level of granularity may range from the broad to the specific. This is, all inbound protocol-X traffic may have a minimum rate of nnn. Inbound HTTP traffic from the network prefix xxx.xx to the destination xxx.xxx.xxx.xxx may have a rate of nnn between the hours of 9 am and 5 pm.

The QoS specifications may encompass the following categories: (1) expected performance characteristics to establish resource commitments; (2) degree of resource commitment to maintain performance guarantees; (3) price a user is willing to incur to obtain a level of service; and (4) degree of adaptation that can be tolerated and the scaling actions to be taken in the event the contracted service cannot be met. These categories are one example embodiment of the present invention as other categories are also within the scope of the present invention.

An example embodiment of QoS negotiation procedure will now be described. The QoS requirements may be assessed/evaluated to determine if they can be met. For example, if the requested level of service cannot be provided, then a period of negotiation may occur where the user is asked what level of degradation is acceptable. This may be an iterative process that takes place between the QoS client, the QoS Firewall entities 23, 25, 27, 29 and 31 and the underlying system platform.

Figure 4:
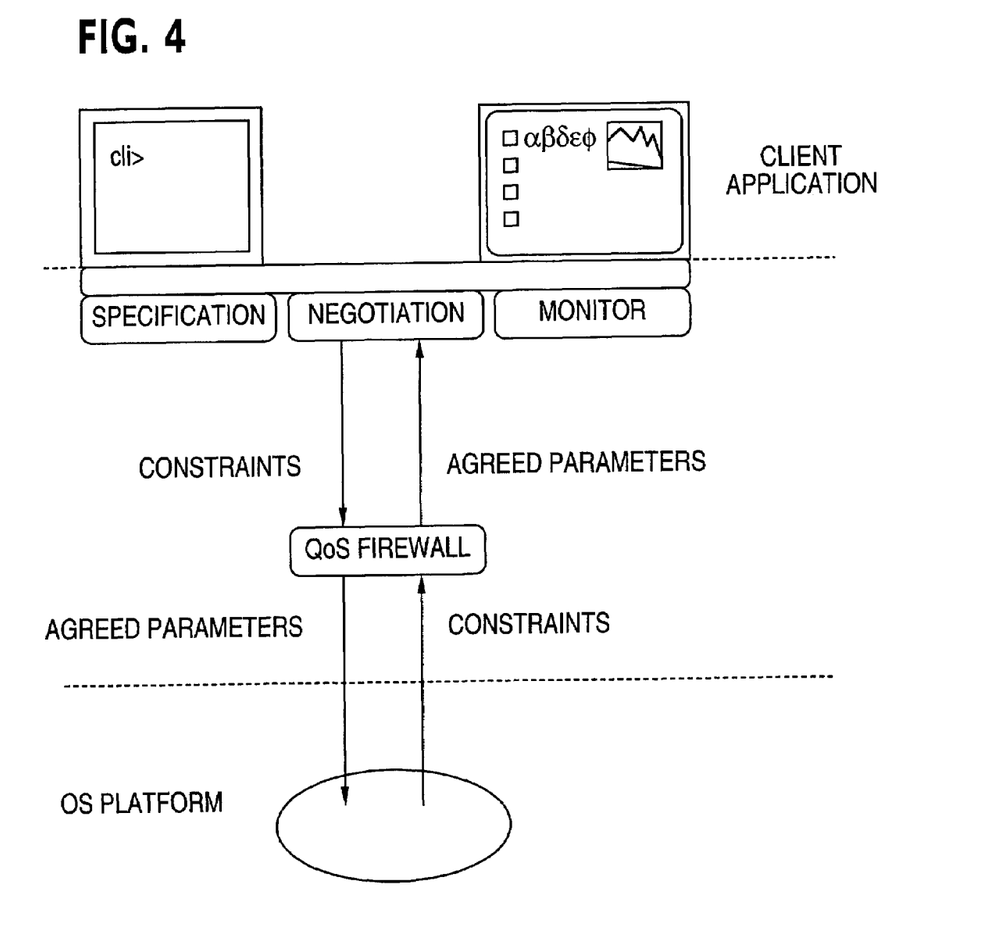
FIG. 4 shows negotiation of user QoS requirements and system-level constraints.

The iterative process may involve determining the following: (1) the type of agreement that is to be reached (e.g. target, range, upper limit, lower limit, threshold, etc.); (2) whether resources are to be allocated to the activity; (3) whether the QoS achieved is to be monitored; and (4) the action to be performed if and when the agreed QoS cannot be maintained. The actions may include renegotiation, reducing the level of service, reducing another competing activity of lower precedence and/or assigning a predefined penalty. FIG. 4 shows one example embodiment of negotiation of user QoS requirements and system-level constraints.

A QoS enforcement procedure will now be described. The QoS parameters may be monitored and system-level resources allocated/reallocated or some other action performed in response to system anomalies. System resources under consideration may include: reserved buffer space, reserved queues, link bandwidth, CPU utilization and timeslice allocation. The QoS Firewall entities 23, 25, 27, 29 and 31 may be responsible for monitoring these resources in order to detect deviations in the QoS parameters.

When there is a state change, then resource adjustments can be automatically handled by the QoS Firewall entities 23, 25, 27, 29 and 31 when fallback requirements have been previously specified along with actions to take when the system state changes (i.e., QoS degradation is detected). This allows the QoS Firewall entities 23, 25, 27, 29 and 31 to gracefully and transparently degrade QoS parameters under certain conditions. Renegotiation is one action that may be taken. This will be discussed below in detail.

When there is a state change and resource adjustments cannot be automatically made in order to compensate (as specified in the original agreement), then the application level may be notified. The operator can either adapt to the new level of QoS or scale to a reduced level of service.

For both QoS negotiation and renegotiation, a list of QoS vectors may be used. This list may define the desired quality and may be sorted by preference or importance (e.g. the parameters are weighted). In the simplest case, three axes (x, y, z) that represent the QoS parameters delay, throughput and rate can be used. The intersection of their bounded region defines a QoS parameter region.

The QoS of a traffic flow may be represented by the vector Q[d,r,t] where d corresponds to the delay, r corresponds to the rate and t corresponds to the throughput. The difference between rate and throughput is packet loss.

During negotiation, a list of vectors may be ranked in order of importance from 0 to a predefined maximum N such as: QoS=(QoS$_0$, ..., QoS$_N$). The ranking may be operator and customer specific. During the process of negotiation, the processing flow may be from the most important vector to the least important vector.

Parameters in each vector may be multi-dimensional. Possible elements for each parameter may include the following: maximum value, maximum rate, percent increment/decrement, importance and probability.

Figure 5:
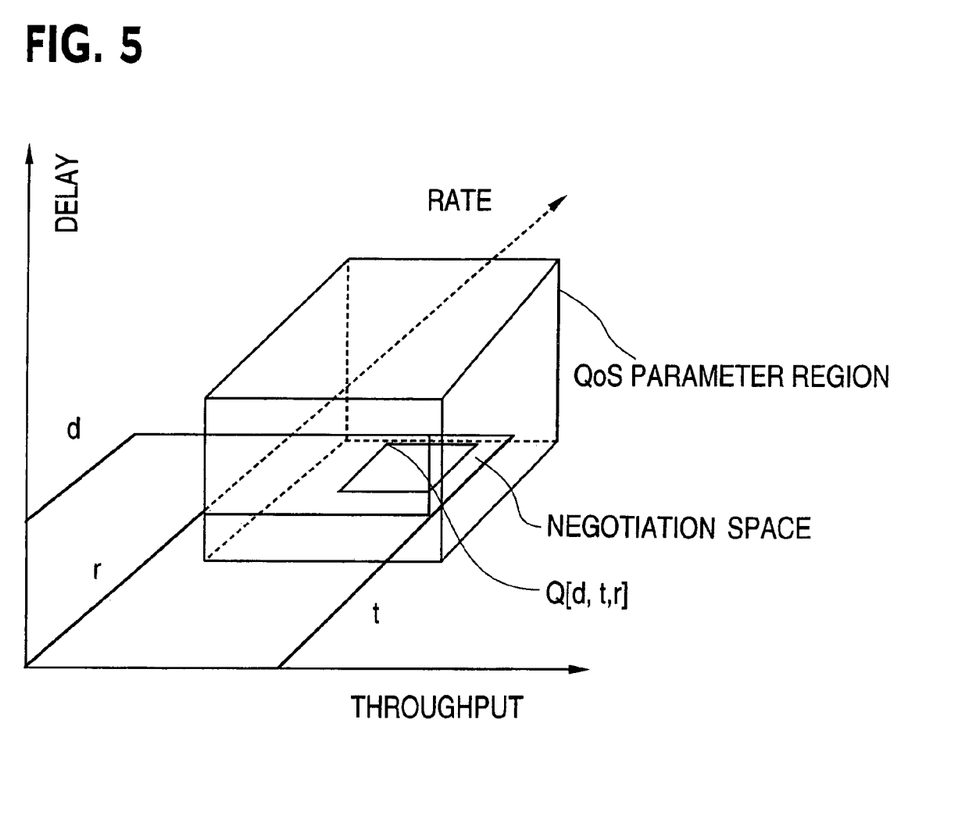
FIG. 5 shows a three-dimensional QoS parameter region.

As discussed above, the QoS parameter values for a live connection may be changed during QoS renegotiation. The list of QoS vectors may be predefined. FIG. 5 shows a three-dimensional QoS parameter region. This region may be bound to the ranges specified by the QoS parameters along the x, y and z axes. During negotiation, the processing flow may be bidirectional meaning that starting with the QoS vector of a live flow or connection (i.e., the current working vector), processing can proceed in both directions towards the most important vector and towards the least important vector.

In order to reduce the renegotiation process, QoS vectors may be categorized into classes or groups to enable realization of the QoS parameters to be split among more than one vector. For example, if there are three vectors in a group, then QoS negotiation may consider all of them at the time and select from a set of three for each of the d, r, and t parameters in order to satisfy the QoS requirements.

Customers' QoS requirements may be mapped to the QoS vectors, and each customer may have a priority ranking. Ranking may be based on the customer's ability and willingness to pay for service.

An algorithm and mechanism may be provided whereby QoS resources can be bought and sold from one customer to the next.

FIG. 5 also shows a negotiation space in which negotiation is possible as the QoS vector associated with a current connection or flow. This vector may be altered using QoS renegotiation limited to the range boundaries defined by the QoS parameter region.

Cost metric may be an additional parameter used in the subsequent protocol and algorithms. Cost metric may include the following values: base monetary rate, percentage increase increment, maximum monetary rate, importance factor, and probability.

Both the initial negotiation process and renegotiation process may utilize the same set of algorithms and protocols. However, the scenarios for them differ. The scenario for negotiation will first be described followed by the scenario for renegotiation.

The network operator may specify QoS parameters including a list of prioritized fallback resources and actions that may be performed in the event of service degradation. The QoS Firewall entities map (i.e., translate) the parameters to system resources. Through the negotiation processing, the QoS Firewall entities may determine which of the QoS vectors, if any, can get applied to the system. If accepted, the parameters may be successfully realized and applied to the system. If rejected, the operator may be notified. On the other hand, the scenario for renegotiation is as follows. Through monitoring, the QoS Firewall entity may determine that one or more connections are experiencing service degradation. Renegotiation for high priority flows may be handled first. Priority of flow may be based on the cost metrics of the customer associated with the flow. It is determined if the available system resources can satisfy one of the available remaining QoS vectors. If it can be met, then that vector becomes associated with the connection and the next connection, if any, requiring renegotiation is handled. If it cannot be met, then the operator may be notified and the resources allocated for the QoS vector are released. The next connection, if any, requiring renegotiation may then be handled.

An example embodiment of a negotiation and renegotiation algorithm will now be described. Other embodiments of the algorithm are also within the scope of the present invention. The following are the algorithm definitions:

Number of flow requiring attention: A
Flows to be processed, sorted in order to priority: Process=(Process$_0$ ..., Process$_A$)
Maximum number of QoS vectors per flow: N
Vector of weighted QoS parameters per flow: QoS=(QoS$_0$ ..., QoS$_N$)
Vector of allocated QoS resources: QoS Allocated
Maximum system resources available for QoS parameters: QoSMax
QoS mapped to QoS parameter vector QoSRequest= (QoS$_0$, ..., QoS$_A$)

The following are the algorithm initializations:
QoSRemaining=SoSMax
ACounter=A
NCounter=N The negotiation algorithm may be as follows:
for (j = 0 ... NCounter) {
QoSRequest$^j$ = [QoS$_j$];
if (QoSRemaining−QoSRequest$_j$ <= QoSMAX){exit;}
else {QoS Allocated$_j$ = QoSRequest$^j$}
j++;
}.

The renegotiation algorithm may be as follows.

while (i=1 ... ACounter) {
  for (j = 0 ... NCounter) {
    QoSRequest$_k$ = Process$^i$[QoS$_j$];
    if(QoSRemaining−QoSRequest$^k$ <= QoSMAX){exit;}
    else { QoS Allocated$_k$ = QoSRequest$^k$}
    j++;
}.

An additional level of detail for the two algorithms may be provided. It is at this point in the algorithm processing whereby the N-dimensional QoS vectors, [$QoS_j$] and Process$_i$ [$QoS_j$], may be mapped to system level resources. The cost metrics may also be applied at this point. A linear graph may be used to determine a cost maximum matching. Since a N-dimensional vector may be used to express the required QoS parameters, a cost function C(d, r,t) may be provided where d signifies delay, r signifies rate and t signifies throughput.

The following may be the cost metric definitions:
Base monetary rate: Base Rate
Percentage incremented: Incr
Maximum monetary rate: MaxRate
Importance of cost: ImpCost
Importance of QoS: ImpQoS
Current cost: Cost
The following may be the cost metric initializations:
Cost=Base Rate
The algorithm may then be as follows.

```
while (i =1 . . . ACounter) {
  if (Cost<MaxRate&&ImpCost < ImpQoS) {
    Cost = Cost + (Incr * Cost ÷100);
  }
  i++;
}
```

Accordingly, embodiments of the present invention may provide a method of operating a differentiated service network having a plurality of routers. This may involve determining an operating condition at a first router and propagating an indication of the first operating condition from the first router to a second router. Embodiments of the present invention may also provide a method of operating a differentiated service network by receiving an indication of an operating condition and adjusting at least one parameter of a constraint in a network profile based on the indication of the operating condition.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. A method comprising:
   determining an operating condition at a first router in a differentiated service network having a plurality of routers based on evaluation of incoming packets and computation of an effective load by each of the plurality of routers;
   propagating an indication of said operating condition at said first router to a second router, wherein a signal indicating at least network traffic status is sent from each of the plurality of routers to a bandwidth broker, the signal of the operating condition of the first router being reflected in the indication; and
   adjusting at least one parameter of constraint of incoming traffic flow based on said indication, wherein said adjusting comprises renegotiating the at least one parameter of constraint or providing a recommendation based on the at least one parameter of constraint,
   wherein said adjusting comprises performing parameter mapping and resource usage calculation.

2. The method of claim 1, wherein said first router comprises a core router and said second router comprises an edge router.

3. The method of claim 1, further comprising:
   determining an operating condition at a third router; and
   propagating an indication of said operating condition at said third router to said second router.

4. The method of claim 1, wherein said operating condition comprises a status of stability.

5. The method of claim 1, wherein said indication comprises a signal corresponding to a network traffic status.

6. The method of claim 5, wherein said network traffic status is represented by a color.

7. The method of claim 1, further comprising said second router making a profile change recommendation to a network operator.

8. The method of claim 1, further comprising said second router renegotiating a constraint of said network.

9. The method of claim 8, wherein said renegotiating comprises selecting from a plurality of constraints.

10. A method comprising:
    receiving, at a second router, an indication of an operating condition at a first router in a differentiated service network having a plurality of routers, wherein the operating condition is determined in the first router based on evaluation of incoming packets and computation of an effective load by each of the plurality of routers and wherein a signal indicating at least network traffic status is sent from each of the plurality of routers to a bandwidth broker, the signal of the operating condition of the first router being reflected in the indication; and
    adjusting at least one parameter of a constraint of incoming traffic flow based on said indication of said operating condition, wherein said adjusting comprises renegotiating the at least one parameter of constraint or providing a recommendation based on the at least one parameter of constraint,
    wherein said adjusting comprises performing parameter mapping and resource usage calculation.

11. The method of claim 10 further comprising:
    determining said operating condition at said first router; and
    propagating said indication of the operating condition at said first router to a second router.

12. The method of claim 11, wherein said first router comprises a core router and said second router comprises an edge router.

13. The method of claim 12, further comprising:
    determining an operating condition at a third router; and
    propagating an indication of said operating condition at said third router to said second router.

14. The method of claim 10, wherein said operating condition comprises a status of stability.

15. The method of claim 10, wherein said indication comprises a signal corresponding to a network traffic status.

16. The method of claim 15, wherein said network traffic status is represented by a color.

17. The method of claim 10, wherein said adjusting comprises said second router renegotiating a constraint of said network.

18. The method of claim 17, wherein said renegotiating comprises selecting from a plurality of constraints.

19. A differentiated service network comprising:
    a first router;
    a second router coupled to said first router, said first router being associated with a first entity to determine an operating condition at the first router based on evaluation of incoming packets and computation of an effective load by each of a plurality of routers, wherein said first entity associated with said first router propagates an indication of said operating condition at said first router device to the second router, wherein a signal indicating at least network traffic status is sent from each of the plurality of routers to a bandwidth broker, the signal of the operating condition of the first router being reflected in the indication; and
an adjusting unit configured to adjust at least one parameter of constraint of incoming traffic flow based on said indication, wherein said adjusting unit is configured to renegotiate renegotiating the at least one parameter of constraint or provide a recommendation based on the at least one parameter of constraint,
wherein said adjusting unit is configured to perform parameter mapping and resource usage calculation.

20. The differentiated service network of claim 19, wherein said second router is associated with a second entity that determines an operating condition at said second router.

21. The differentiated service network of claim 20, wherein said second entity renegotiates a constraint of said network.

22. The differentiated service network of claim 21, wherein renegotiating comprises selecting from a plurality of constraints.

23. The differentiated service network of claim 19, wherein said operating condition comprises a status of stability.

24. The differentiated service network of claim 23, wherein said indication comprises a signal corresponding to a network traffic status.

25. The differentiated service network of claim 19, wherein said first entity comprises a QoS Firewall entity.

26. The differentiated service network of claim 19, wherein said first router comprises a core router and said second router comprises an edge router.

27. An apparatus, said apparatus comprising:
determining means for determining an operating condition at a first router in a differentiated service network having a plurality of routers based on evaluation of incoming packets and computation of an effective load by each of the plurality of routers;
propagating means for propagating an indication of said operating condition at said first router to a second router, wherein a signal indicating at least network traffic status is sent from each of the plurality of routers to a bandwidth broker, the signal of the operating condition of the first router being reflected in the indication; and
adjusting means for adjusting at least one parameter of constraint of incoming traffic flow based on said indication, wherein said adjusting means comprises means for renegotiating the at least one parameter of constraint or providing a recommendation based on the at least one parameter of constraint,
wherein said adjusting comprises performing parameter mapping and resource usage calculation.

28. A second router comprising:
receiving means for receiving, at the second router, an indication of an operating condition at a first router, wherein the operating condition is determined in the first router based on evaluation of incoming packets and computation of an effective load by each of the plurality of routers and wherein a signal indicating at least network traffic status is sent from each of the plurality of routers to a bandwidth broker, the signal of the operating condition of the first router being reflected in the indication; and
adjusting means for adjusting at least one parameter of a constraint of incoming traffic flow based on said indication of said operating condition, wherein said adjusting means comprises means for renegotiating the at least one parameter of constraint or providing a recommendation based on the at least one parameter of constraint,
wherein said adjusting comprises performing parameter mapping and resource usage calculation.

29. A first router, comprising:
coupling means for coupling the first router to a second router, said first router being associated with a first entity to determine an operating condition at the first router based on evaluation of incoming packets and computation of an effective load by each of a plurality of routers, wherein said first entity associated with said first router propagates an indication of said operating condition at said first router device to the second router, wherein a signal indicating at least network traffic status is sent from each of the plurality of routers to a bandwidth broker, the signal of the operating condition of the first router being reflected in the indication,
wherein the second router includes means adjusting at least one parameter of constraint of incoming traffic flow based on said indication, wherein said adjusting means comprises means for renegotiating the at least one parameter of constraint or providing a recommendation based on the at least one parameter of constraint and, said adjusting means comprises means for performing parameter mapping and resource usage calculation.

\* \* \* \* \*